(12) United States Patent
Petrovic

(10) Patent No.: US 9,485,089 B2
(45) Date of Patent: Nov. 1, 2016

(54) STEGO KEY MANAGEMENT

(71) Applicant: Verance Corporation, San Diego, CA (US)

(72) Inventor: Rade Petrovic, San Diego, CA (US)

(73) Assignee: Verance Corporation, San Diego, CA (US)

( * ) Notice: Subject to any disclaimer, the term of this patent is extended or adjusted under 35 U.S.C. 154(b) by 618 days.

(21) Appl. No.: 13/923,147

(22) Filed: Jun. 20, 2013

(65) Prior Publication Data

US 2014/0376723 A1     Dec. 25, 2014

(51) Int. Cl.
*H04L 9/08* (2006.01)
*G09C 5/00* (2006.01)

(52) U.S. Cl.
CPC ............... *H04L 9/0819* (2013.01); *G09C 5/00* (2013.01); *H04L 2209/608* (2013.01)

(58) Field of Classification Search
None
See application file for complete search history.

(56) References Cited

U.S. PATENT DOCUMENTS

| | | | |
|---|---|---|---|
| 6,122,610 A | 9/2000 | Isabelle | |
| 6,145,081 A | 11/2000 | Winograd et al. | |
| 6,175,627 B1 | 1/2001 | Petrovic et al. | |
| 6,427,012 B1 | 7/2002 | Petrovic | |
| 6,430,301 B1 | 8/2002 | Petrovic | |
| 6,683,958 B2 | 1/2004 | Petrovic | |
| 6,792,542 B1 | 9/2004 | Lee et al. | |
| 6,888,943 B1 | 5/2005 | Lam et al. | |
| 7,024,018 B2 | 4/2006 | Petrovic | |
| 7,159,118 B2 | 1/2007 | Petrovic | |
| 7,460,667 B2 | 12/2008 | Lee et al. | |
| 7,983,922 B2 | 7/2011 | Neusinger et al. | |
| 7,986,806 B2 | 7/2011 | Rhoads | |
| 7,991,995 B2 | 8/2011 | Rabin et al. | |

(Continued)

FOREIGN PATENT DOCUMENTS

| | | |
|---|---|---|
| JP | 2004163855 | 6/2004 |
| JP | 2004173237 | 6/2004 |

(Continued)

OTHER PUBLICATIONS

Polistchuck, Daniel. "Writing Custom Data to Executable Files in Windows and Linux." Writing Custom Data to Executable Files in Windows and Linux. Embarcadero Developer Network, Mar. 21, 2009. Web. Dec. 22, 2015.*

(Continued)

*Primary Examiner* — Chan Park
*Assistant Examiner* — Geoffrey E Summers
(74) *Attorney, Agent, or Firm* — Perkins Coie LLP; Donald L. Wenskay

(57) ABSTRACT

Systems, methods, devices and computer program products are provided that improve stego key management of watermarking systems and reduce the impact of leaked secrets related to watermark embedding and extraction operations. In the event that a watermark extractor is compromised and its extraction stego key is revealed, new extraction stego key sets are generated and assigned to a particular group of devices with similar security features. The new extraction stego key sets have significant overlap with one another, and can be retired once a device within the particular group of devices is compromised. The described techniques are complementary to other security enhancement practices, such as obfuscation and tamper resistant techniques, to strengthen the security of a watermarking system.

39 Claims, 7 Drawing Sheets

(56) References Cited

U.S. PATENT DOCUMENTS

| | | |
|---|---|---|
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,085,935 B2 | 12/2011 | Petrovic |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,533,481 B2 | 9/2013 | Petrovic et al. |
| 8,538,066 B2 | 9/2013 | Petrovic et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,923,548 B2 | 12/2014 | Petrovic et al. |
| 9,009,482 B2 | 4/2015 | Winograd |
| 9,055,239 B2 | 6/2015 | Tehranchi et al. |
| 9,106,964 B2 | 8/2015 | Zhao |
| 9,117,270 B2 | 8/2015 | Wong et al. |
| 2003/0070075 A1 | 4/2003 | Deguillaume et al. |
| 2004/0193919 A1* | 9/2004 | Dabbish ............ G06F 21/10 726/8 |
| 2007/0039018 A1 | 2/2007 | Saslow et al. |
| 2009/0282403 A1* | 11/2009 | Poole ............ H04L 67/34 717/178 |
| 2010/0011217 A1 | 1/2010 | Tachibana et al. |
| 2010/0111355 A1 | 5/2010 | Petrovic et al. |
| 2011/0261667 A1 | 10/2011 | Ren et al. |
| 2011/0293090 A1 | 12/2011 | Ayaki et al. |
| 2011/0320627 A1 | 12/2011 | Landow et al. |
| 2012/0017091 A1* | 1/2012 | Petrovic ............ G06T 1/0028 713/176 |
| 2012/0023595 A1 | 1/2012 | Speare et al. |
| 2012/0072731 A1 | 3/2012 | Winograd et al. |
| 2012/0102304 A1 | 4/2012 | Brave |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2014/0067950 A1 | 3/2014 | Winograd |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2014/0376723 A1 | 12/2014 | Petrovic |
| 2015/0030200 A1 | 1/2015 | Petrovic et al. |
| 2015/0121534 A1 | 4/2015 | Zhao et al. |

FOREIGN PATENT DOCUMENTS

| | | |
|---|---|---|
| JP | 2004193843 | 7/2004 |
| JP | 2004194233 | 7/2004 |
| JP | 2004-328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 1020120128149 | 11/2012 |
| WO | 0213138 | 2/2002 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011116309 | 9/2011 |
| WO | 2013163921 | 11/2013 |
| WO | 2015030894 | 3/2015 |

OTHER PUBLICATIONS

Aris Technologies, Inc. "Audio Watermarking System to Screen Digital Audio Content for LCM Acceptance," May 1999 (17 pages).

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual watermarking and fingerprinting system," Multimedia '02 Proceedings of the tenth ACM international conference on Multimedia, 2002 (11 pages).

Verance Corporation, "Confirmedia," PowerPoint presentation made to National Association of Broadcasters, Apr. 24, 2001 (40 pages).

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

International Search Report and Written Opinion dated Feb. 25, 2015 for International Application No. PCT/US2014/041166, filed Jun. 5, 2014 (8 pages).

* cited by examiner

| Dimension Index (i) | Description Of Component | Component Key Length ($L_p^i$) | |
|---|---|---|---|
| 1 | Time segment | 16 | |
| 2 | Type of Algorithm | 4 | |
| 3 | Frequency shift | 27 | |
| 4 | PN sequence | 10 | |
| 5 | Frequency band | 25 | Key Length ($L_p$) = 82 bits |

FIG. 2
(PRIOR ART)

STEGO KEY MANAGEMENT

FIELD OF INVENTION

The present application generally relates to the field of content management. More particularly, the disclosed embodiments relate to improving security of a content management system that is based on watermarking.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Watermarks are substantially imperceptible signals embedded into a host content. The host content may be any one of audio, still image, video or any other content that may be stored on a physical medium or transmitted or broadcast from one point to another. Watermarks are designed to carry auxiliary information without substantially affecting fidelity of the host content, or without interfering with normal usage of the host content. For this reason, watermarks are sometimes used to carry out covert communications, where the emphasis is on hiding the very presence of the hidden signals. Other widespread applications of watermarks include prevention of unauthorized usage (e.g., duplication, playing and dissemination) of copyrighted multi-media content, proof of ownership, authentication, tampering detection, content integrity verification, broadcast monitoring, transaction tracking, audience measurement, triggering of secondary activities such as interacting with software programs or hardware components, communicating auxiliary information about the content such as caption text, full title and artist name, or instructions on how to purchase the content, and the like. The above list of applications is not intended to be exhaustive, as many other present and future systems can benefit from co-channel transmission of main and auxiliary information.

In some applications of watermarks, such as copy management applications, the watermarks that are embedded in a host content must often be extracted in consumer products (e.g., media players, copiers, etc.) that access and use the content such as video, audio and images. In applications where the watermark extractors are widely available to the general public, it is reasonable to expect reverse engineering attacks that attempt to understand the operation of watermark extractor (e.g., the watermark extraction algorithm) and to obtain secret information associated with the watermarks (e.g., the stego key). Once the watermark extraction algorithms and stego keys are known, the attacker can manipulate the host content in such a way to, for example, interfere with the extraction of embedded watermarks, manipulate copyright enforcement actions or to insert unauthorized watermarks in the host content. In this disclosure, watermark extraction means the extraction of watermark payload, i.e. the message carried by the watermark, and it doesn't mean the removal or erasure of watermark from the host content. Alternatively, watermark extraction can be called watermark detection, but sometimes watermark detection is used to indicate detection of the presence of a watermark within the host content without actually extracting the payload carried by the watermark.

Some protection techniques such as implementation of code obfuscation measures and tamper resistant implementation of watermark extractors can hamper the attackers' efforts. However, those measures may be costly to implement or may be improperly implemented, thus allowing a tamper-prone device to be released in the market place and be subject to reverse engineering attacks by a large community of resourceful hackers. Moreover, due to the number of different media player and copier types and brands that are currently operating on different platforms, it is likely that a large number of different implementers will be involved in implementation of watermark extractors in their products, which leaves open the possibility that extractor implementation details and secrets can be inadvertently or intentionally leaked to the public.

SUMMARY

The disclosed embodiments relate to systems, methods and computer program products that improve stego key management of watermarking systems and reduce the impact of leaked secrets related to watermark embedding and extraction operations. The disclosed embodiments can be used, for example, as complementary techniques to other security enhancement practices, such as obfuscation and tamper resistant techniques, to strengthen the security of a watermarking system.

One aspect of the disclosed embodiments relates to a method for watermark extraction stego key assignment when one or more existing extraction stego key sets have been compromised. Such a method includes receiving information indicative of the one or more previously assigned watermark extraction stego key sets that have been compromised and processing an extraction stego key space to obtain a first plurality of extraction stego key sets such that: (a) each of the first plurality of extraction stego key sets has at least 50% overlap with another extraction stego key set of the first plurality of extraction stego key sets, and (b) each of the first plurality of extraction stego key sets has less than 20% overlap with all of the compromised extraction key sets. The above noted method further comprises assigning a first extraction stego key set from the first plurality of extraction stego key sets to a first group of devices, and communicating the first extraction stego key set from the first plurality of extraction stego keys to a corresponding device within the first group of devices.

In one exemplary embodiment, processing the extraction stego key space to obtain a first plurality of extraction stego key sets further comprises processing each of the first plurality of extraction stego key sets with a watermark extraction engine associated with the first group of devices to ensure that a number of watermark extraction operations and memory footprint associated with the processed extraction stego key set and the watermark extraction engine remain unchanged as compared to a number of watermark extraction operations and memory footprint associated with the one or more compromised extraction stego key sets and the watermark extraction engine. In another exemplary embodiment, a portion of the extraction stego key space associated with the one or more compromised extraction stego key sets is retired from further use.

In another exemplary embodiment, the above noted method additionally includes assigning a second extraction stego key set from the first plurality of extraction stego key sets to a second group of devices, and communicating the second extraction stego key set from the first plurality of extraction stego key sets to a corresponding device within the second group of devices. According to one exemplary embodiment, each device within the first group of devices corresponds to a first model and brand of a particular media handling device. In another exemplary embodiment, each device within the first group of devices corresponds to a first model and brand of a particular media handling device, and each device within the second group of devices corresponds to a second model and brand of the particular media handling device. In yet another exemplary embodiment, each device within the first group of devices corresponds to a first manufacturer of a media handling device, and each device within the second group of devices corresponds to a second manufacturer of a media handling device.

In still another exemplary embodiments, the above noted method further comprises processing the extraction stego key space to obtain a second plurality of extraction stego key sets such that (a) each of the second plurality of extraction stego key sets has at least 50% overlap with another extraction stego key set of the second plurality of extraction stego key sets, (b) each of the second plurality of extraction stego key sets has less than 20% overlap with all of the compromised extraction key sets, and (c) each of the second plurality of extraction stego key sets has less than 10% overlap with all of the first plurality of extraction stego key sets. This exemplary embodiment further includes assigning a first extraction stego key set from the second plurality of extraction stego key sets to a corresponding device within a second group of devices. In another exemplary embodiment, each of the second plurality of extraction stego key sets has less than 1% overlap with all of the first plurality of extraction stego key sets.

In yet another exemplary embodiment, all devices within the first group of devices are protected against watermark extraction circumvention according to a first level of security, and all devices within the second group of devices are protected against watermark extraction circumvention according to a second level of security. According to one exemplary embodiment, the processing of the extraction stego key space to obtain the first and the second plurality of extraction stego key sets is conducted so as to allocate a first portion of the extraction stego key space to accommodate all of the first plurality of extraction stego key sets and allocate a second portion of the extraction stego key space to accommodate all of the second plurality of extraction stego key sets, where the first portion is non-overlapping with the second portion.

In one exemplary embodiment, each device within the first group of devices utilizes similar security measures as any other device within the first group of devices against watermark extraction circumvention attacks. In another exemplary embodiment, processing the extraction stego key space comprises expanding the extraction stego key space to obtain at least a portion of the first plurality of extraction stego key sets from the expanded extraction stego key space. For example, expanding the extraction stego key space can include generating one or more new extraction stego key space dimensions. In yet another exemplary embodiment, the corresponding device within the first group of devices to which the first extraction stego key set from the first plurality of extraction stego key sets is communicated is a newly deployed device. In yet another exemplary embodiment, the above noted method further includes receiving an indication that the corresponding device within the first group of devices is a trustworthy device, where only upon receiving the indication, the first extraction stego key set from the first plurality of extraction stego key sets is communicated to the corresponding device.

In another exemplary embodiment, the above noted method additionally includes producing a new processor-executable program code that includes both the first extraction stego key set and a watermark extraction program code, where communicating the first extraction stego key set comprises communicating the new processor-executable program code to the corresponding device. In one exemplary embodiment, the size of the new processor-executable program code is identical to the size of an old processor executable code that includes both one of the one or more previously assigned watermark extraction stego key sets that has been compromised and the watermark extraction program code. In yet another exemplary embodiment, the new processor executable program code is received at the corresponding device and stored on a tangible storage medium of the corresponding device to replace the old processor-executable program code.

Another aspect of the disclosed embodiments relates to a device that includes a processor and a memory comprising processor executable code. The processor executable code, when executed by the processor, configures the device to receive information indicative of one or more previously assigned watermark extraction stego key sets that have been compromised and to process an extraction stego key space to obtain a first plurality of extraction stego key sets such that (a) each of the first plurality of extraction stego key sets has at least 50% overlap with another extraction stego key set of the first plurality of extraction stego key sets, and (b) each of the first plurality of extraction stego key sets has less than 20% overlap with all of the compromised extraction key sets. The processor executable code, when executed by the processor, configures the device to assign a first extraction stego key set from the first plurality of extraction stego keys to a first group of devices, and communicate the first extraction stego key set from the first plurality of extraction stego keys to a corresponding device within the first group of devices.

In one exemplary embodiment, the processor executable code, when executed by the processor, further configures the device to further process each of the first plurality of extraction stego key sets with a watermark extraction engine associated with the first group of devices to ensure that a number of watermark extraction operations and memory footprint associated with the processed extraction stego key set and the watermark extraction engine remain unchanged as compared to a number of watermark extraction operations and memory footprint associated with the one or more compromised extraction stego key sets and the watermark extraction engine. According to another exemplary embodiment, the processor executable code, when executed by the processor, further configures the device to retire from further use a portion of the extraction stego key space associated with the one or more compromised extraction stego key sets. In another embodiment, the processor executable code, when executed by the processor, further configures the device to assign a second extraction stego key set from the first plurality of extraction stego key sets to a second group of devices, and communicate the second extraction stego key set from the first plurality of extraction stego key sets to a corresponding device within the second group of devices.

In another embodiment, the processor executable code, when executed by the processor, further configures the device to process the extraction stego key space to obtain a second plurality of extraction stego key sets such that (a) each of the second plurality of extraction stego key sets has at least 50% overlap with another extraction stego key set of the second plurality of extraction stego key sets, (b) each of the second plurality of extraction stego key sets has less than 20% overlap with all of the compromised extraction key sets, and (c) each of the second plurality of extraction stego key sets has less than 10% overlap with all of the first plurality of extraction stego key sets. In this exemplary embodiment, the processor executable code, when executed by the processor, also configures the device to assign a first extraction stego key set from the second plurality of extraction stego key sets to a corresponding device within a second group of devices.

In one exemplary embodiment, the processor executable code, when executed by the processor, further configures the device to allocate a first portion of the extraction stego key space to accommodate all of the first plurality of extraction stego key sets and allocate a second portion of the extraction stego key space to accommodate all of the second plurality of extraction stego key sets, and wherein the first portion is non-overlapping the second portion. In another exemplary embodiment, the processor executable code, when executed by the processor, configures the device to process the extraction stego key space to expand the extraction stego key space, and to obtain at least a portion of the first plurality of extraction stego key sets from the expanded stego key space. In yet another exemplary embodiment, the processor executable code, when executed by the processor, further configures the device to receive an indication that the corresponding device within the first group of devices is a trustworthy device, where only upon receiving the indication, the first extraction stego key from the first plurality of extraction stego key sets is communicated to the corresponding device within the first group of devices.

In one exemplary embodiment, the processor executable code, when executed by the processor, further configures the device to produce a new processor-executable program code that includes both the first extraction stego key set and a watermark extraction program code, where the device is configured to communicate the first extraction stego key set as part of the new processor-executable program code to the corresponding device. In another exemplary embodiment, the size of the new processor-executable code is identical to the size of an old processor executable code that includes both one of the one or more previously assigned watermark extraction stego key sets that has been compromised and the watermark extraction program code.

Another aspect of the disclosed embodiments relates to a computer program product, embodied on one or more non-transitory computer readable media, that comprises program code for receiving information indicative of the one or more previously assigned watermark extraction stego key sets that have been compromised, and program code for processing an extraction stego key space to obtain a first plurality of extraction stego key sets such that: (a) each of the first plurality of extraction stego key sets has at least 50% overlap with another extraction stego key set of the first plurality of extraction stego key sets, and (b) each of the first plurality of extraction stego key sets has less than 20% overlap with all of the compromised extraction key sets. The above computer program product further includes program code for assigning at a first extraction stego key set from the first plurality of extraction stego key sets to a first group of devices, and program code for communicating the first extraction stego key set from the first plurality of extraction stego key sets to the corresponding device within the first group of devices.

In one exemplary embodiment, the computer program product further comprises program code for producing a new processor-executable program code that includes both the first extraction stego key set and a watermark extraction program code, where the first extraction stego key set is communicated to the corresponding device as part of a new processor-executable program code.

Another aspect of the disclosed embodiments relates to a system that includes a stego key management device and a first device. The stego key management device of such a system includes a processor, and a memory comprising processor executable code. The processor executable code, when executed by the processor, configures the stego key management device to receive information indicative of one or more previously assigned watermark extraction stego key sets that have been compromised, and process an extraction stego key space to obtain a first plurality of extraction stego key sets such that (a) each of the first plurality of extraction stego key sets has at least 50% overlap with another extraction stego key set of the first plurality of extraction stego key sets, and (b) each of the first plurality of extraction stego key sets has less than 20% overlap with all of the compromised extraction key sets. The processor executable code, when executed by the processor, also configures the stego key management device to assign a first extraction stego key set from the first plurality of extraction stego keys to a first group of devices, and communicate the first extraction stego key set from the first plurality of extraction stego keys to the first device within the first group of devices. The first device of such a system includes a first processor and a first memory comprising program code executable by the first processor. The program code from the first memory when executed by the first processor, configures the first device to receive the first extraction stego key set from the stego key management device, and store the first extraction stego key set at the first memory.

In one exemplary embodiments, the processor executable code, when executed by the processor of the stego key management device, further configures the stego key management device to produce a new processor-executable program code that includes both the first extraction stego key set and a watermark extraction program code, and to communicate the first extraction stego key set as part of the new processor-executable program code to the first device.

BRIEF DESCRIPTION OF THE DRAWINGS

FIG. 2 is a table illustrating exemplary constituents of a stego key set.

DETAILED DESCRIPTION OF CERTAIN EMBODIMENTS

Figure 1:
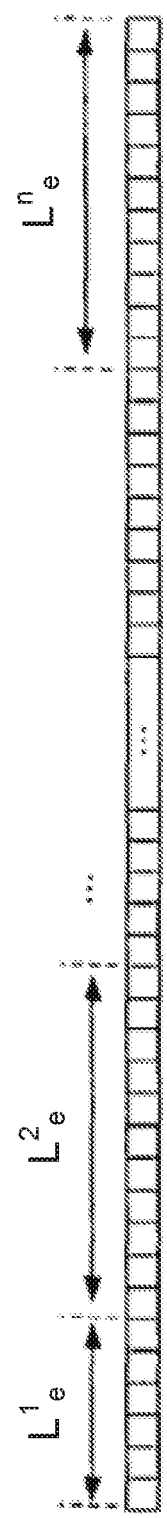
FIG. 1 is an exemplary illustration of n-dimensional stego key.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

In the present application, the term stego key is used to convey secret information that is used for embedding watermarks (i.e., an embedding stego key, also sometimes referred to as an embedder stego key to designate its correspondence to a watermark embedder) or secret information that is used for extraction of embedded watermarks (i.e., an extraction stego key, also sometimes referred to as an extractor stego key to designate its correspondence to a watermark extractor). It should be noted that an embedding or extraction stego key of the present application is not the same as an encryption or decryption keys that are well known in the art of information security. In particular, an encryption/decryption key is a random number that is typically used to initialize an encryption/decryption engine, and, in some cases such as a stream cipher, to directly modify the data bits that are being encrypted. An encryption/decryption key typically has a fixed length. For example, an encryption key used in the Advanced Encryption Standard (AES) is a sequence of 128 to 256 bits. There are numerous publications related to the generation of random encryption/decryption keys, and particularly, related to techniques for generation of optimally random and/or pseudorandom encryption keys that make it difficult to mount anything other than a "brute force" attack (i.e., a trial and error procedure which systematically examines each combination of e.g., the 128-bit sequence) to discover a particular encryption/decryption key.

In contrast to the encryption/decryption keys described above, the embedding and extraction stego key provide information related to the locations and characteristics of watermark symbols to be embedded or extracted from a host content. In particular, each of the embedding and extraction stego keys of the present application is comprised of many components where each component may be considered one dimension of an n-dimensional stego key space. This concept is explained in further detail in the commonly owned U.S. Pat. No. 8,340,348 (hereinafter "the '348 patent"), which is hereby incorporated by reference in its entirety, and is also provided here to facilitate the understanding of the disclosed embodiments.

The constituents of the n-dimensional stego key space of the present application may vary depending on the nature and type of the host content or the specific application of watermarking system. For example, the number and type of stego key components for still image watermarking may differ from those corresponding to video or audio watermarking. In addition, the stego keys for embedding and extraction are generally of different lengths and may span different dimensions in the stego key space. In general, an embedding stego key of length $L_e$ may be represented as:

$$L_e = \Sigma L_e^i = L_e^1 + L_e^2 + L_e^3 + \ldots L_e^n$$

In the above equation, n is the dimension of stego key space and $L_e^i$ represents the length of each component, i, for $1 \leq i \leq n$, as shown in FIG. 1. An embedding stego key is used to embed watermarks into a host content with specific characteristics, at specific locations within the host content, and according to a specific watermarking algorithm. As such the stego keys of the present application comprise a plurality of parameters that describe specific aspects of the embedded watermarks and the watermarking system. Due to the presence of multiple parameters in the stego keys of the present application, sometime the term "stego key set" is used to refer to a stego key that is used for embedding (i.e., an embedding stego key set) or for extraction (i.e., an extraction stego key set) of watermarks.

To further illustrate the concept of a stego key, stego key components for an audio watermarking system in a 5-dimensional key space is illustrated in the table in FIG. 2. The first component of the stego key (Dimension 1) may represent the particular time slot within the audio content that is targeted for embedding. In this example, using 16 bits allows selection of 65,536 different time slots. The second component (Dimension 2) allows the selection of one or more embedding algorithms. Components 3 and 4 (Dimensions 3 and 4) respectively represent frequency shift and PN sequence lengths that are associated with each embedding algorithm. Component 5 (Dimension 5) corresponds to the number of distinct frequency segments in the content that is targeted for embedding. Note that the granularity of time and frequency components may vary according to the desired level of watermark capacity, security, transparency and robustness in accordance with system performance requirements and particular embedding algorithm. In addition, the duration of time slots and/or the spectral width of frequency bands may not be held constant throughout the content. These variations may be based on a pre-calculated variation pattern, a random variation pattern or may be in accordance to the characteristics of the host content. It is also entirely possible to have different time/frequency granularities for different embedding algorithms. Incorporation of such additional features would result in an even longer stego key.

Note that the stego key illustrated in FIG. 2 only provides an example of a 5-dimensional stego key space to facilitate understanding of the underlying concepts. In practice, some dimensions may be added (or removed) to achieve the desired system performance. The illustrated configuration allows embedding of the same time/frequency/spatial segment of the content with one or more watermarking algorithms. Of course, the number and strength of overlapping watermark layers/bands must not produce perceptible artifacts as mandated by the transparency requirements of the system. System performance requirements greatly vary from one application to another. Similar tables associated with embedding stego key spaces of may also be constructed for other forms of multimedia content such as texts, still images or video streams. For example, an embedding or extraction stego key for a feature film may comprise additional spatial and temporal frequency dimensions corresponding to video portions of the motion picture, as well as spatial extent of watermarks corresponding to individual frames of the motion picture.

In order to successfully extract the embedded watermarks, an extraction stego key set must be present at the extraction device. It should be noted that the term watermark extraction (or watermark extractor) describe the operations (or the corresponding device) for recovering the embedded watermarks from a host content. The term extraction should not be equated with expunging the host content from embedded watermarks. In fact, in most watermarking systems such a removal of watermarks is not desired since it is likely to damage the perceptual quality of the host content. The present system, in most general cases, uses an asymmetric stego key approach for extracting the watermarks. In the absence of channel distortions, where content is delivered in pristine condition to its destination, it may be sufficient to know the exact embedding algorithms and the specific embedding parameters in order to extract the watermarks from the received content (i.e., use a symmetric stego key approach). However, in the presence of channel distortions, which may be the result of intentional or unintentional processing or attacks, the exact version of the embedding stego key may not be successful in extracting the distorted watermarks. This is due to the fact that the embedded watermarks may appear to have been embedded with a different set of parameters. For example, for a watermark that is hidden in an audio signal in the frequency band 4,000 Hz to 4,200 Hz, a pitch-shift processing that increases pitch of the host content by 5%, would move the embedded region to the band 4,200 Hz to 4,410 Hz. A properly designed extractor must search for the presence of watermarks not only in the original 4,000-4,200 Hz band but also in 4,200-4,410 Hz band (or, approximately, in 4,200-4,400 Hz band) in anticipation of probable channel impairments. Similarly, for an image with an 8×8 watermarked pixel area, if the screen size is transformed from a 16:9 into a 4:3 aspect ratio, the 8×8 watermarked pixel area could become an 8×6 pixel area. An extraction stego key set that is configured for both the 8×8 and 8×6 pixel areas would successfully extract watermarks in the presence (or absence) of this type of distortion.

The embedder stego key space may include as many keys as possible to account for all possible transformations. However, it is not necessary to incorporate all possible transformations of the stego key into the embedder key space. Furthermore, the extractor key space is not necessarily limited to embedder key space. It may not only include the entire embedder key space, so that each embedded watermark has a chance of being detected in clear channel, but it may also include a substantial number of stego keys that are generated by transformations outside the embedder key space.

Figure 3A:
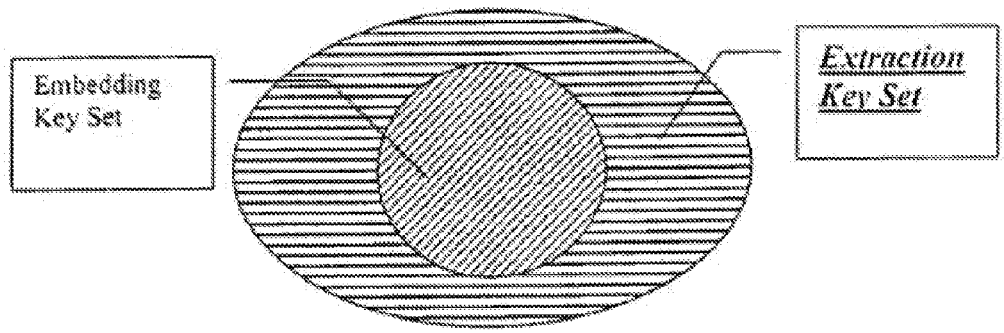
FIG. 3a is an example pictorial presentation of embedding and extraction stego key sets in a stego key space in the absence of distortions.
Figure 3B:
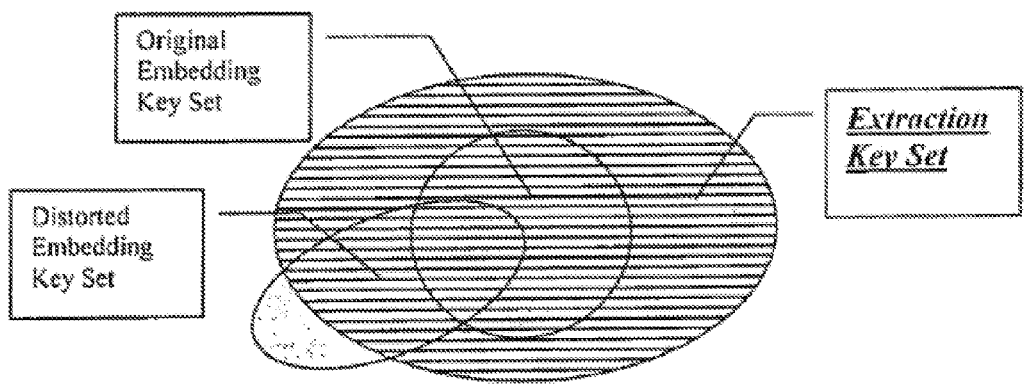
FIG. 3b is an example pictorial presentation of embedding and extraction stego key sets in a stego key space in the presence of distortions.

This concept of asymmetric embedding and extraction key sets is shown pictorially in FIGS. 3a and 3b. In FIG. 3a, the small circle represents an embedding stego key set and the large oval represents an extraction stego key set. The fact that the embedding stego key set completely lies within the larger extraction stego key set indicates that all embedded watermarks (in the absence of channel distortions) may be extracted from the content. This also indicates that some extraction attempts (the ones that look for embedded watermarks outside the embedded regions) are necessarily futile but this additional processing is a small price to pay for achieving enhanced security and improved robustness performance. In FIG. 3b, the same extraction stego key set is used for extraction in the presence of channel distortions that have altered the appearance of the embedding key set. As illustrated in FIG. 3b, the distorted embedding stego key set may fall partly outside the extractor stego key set that is utilized in a particular extractor, indicating that it is not necessary to recover all watermarks from a content.

In general, in the presence of channel distortions some portions of the embedding stego key set may remain unchanged or stay within the original embedding stego key space (i.e., overlap area between the original and distorted key sets in FIG. 3b) while other portions of the embedding stego key set may move to the areas outside the original embedding stego key space but within the extractor stego key space. Yet, other portions of the embedding stego key set may completely move outside the extraction stego key space. This illustrates the fact that it is possible and advantageous to select the embedding stego key set in such a way that it includes many "transformed" embedding stego keys (i.e., the stego keys that can be converted from one to the other through regular signal processing or through an attack). In addition, this figure illustrates that having a larger extractor stego key space produces an increased chance of successful watermark extraction in presence of distortions. Finally, this figure illustrates the fact that it is not necessary to make the extractor stego key space large enough to cover all possible transformed embedding stego keys. It is quite acceptable not to be able to detect some watermarks that fall outside of the extraction stego key space due to signal processing and/or attacks.

Figure 4:
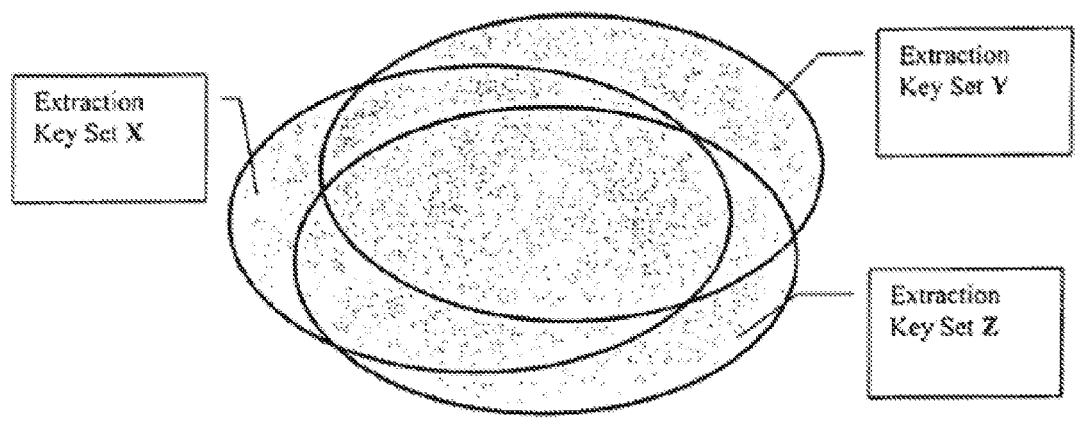
FIG. 4 is an example pictorial presentation of multiple extraction stego key sets in a stego key space.

FIG. 4 illustrates three extraction key sets X, Y and Z, which can be, for example, assigned to three different devices. These keys can be assigned at to the corresponding extraction devices in view of anticipated attacks on a particular device. For example, if the extractor resides in a camcorder that may be used for theater piracy, the extractor key set doesn't need to include transform keys obtained through speed up or slow down of the content. For any deployed extractor that is readily available to the general public, there is the possibility that such an extractor becomes the subject of an attack or a leak, which exposes the extraction stego key set.

One method of minimizing the impact of a leak that publicly exposes extractor secrets is described in the above referenced '348 patent based on deployment of only a subset of the extraction stego keys per device model or class. In one example scenario, an attack reveals the extraction stego keys of a particular device, and is used to mount an attack to circumvent extraction of watermarks. Under this attack scenario, the device, or group of devices, with the compromised stego key set will stop performing copyright protection. However, other devices, which use stego keys that are outside of the compromised stego key set, can still extract other watermarks within the content assuming that the content is marked with multiple watermarks using wide variations of stego keys as disclosed in the '348 patent. Further, in some examples, the stego key sets of the '348 patent that are deployed in distinct devices partially overlap in order to accommodate a large number of device models or groups. The attackers may further manage to penetrate multiple devices with distinct stego key sets and mount an attack based on an aggregate set of compromised keys. Depending on size of the aggregate, it may be possible that a non-compromised device has its entire extraction stego key set uncovered by the aggregate set of compromised keys obtained from other, more vulnerable devices. Also, if some, but not all, of stego keys in a stego key set in a non-compromised device are attacked by means of attacking the aggregate of keys from compromised devices, enforcement actions, that rely on a particular number or spacing of watermark extractions before commencing a copyright protection action, can be delayed for the non-compromised device.

One aspect of the disclosed embodiments relates to a dynamic stego key management that can be adjusted in view of observed attacks on the currently deployed extractors. One objective of the disclosed embodiments is to devise methods for stego key management of watermark extractors that mitigates the impact of attack scenarios in which stego key sets associated with multiple devices are compromised to mount subsequent attacks on marked content that would render watermarks associated with compromised stego keys undetectable.

It should be noted that to mitigate the impact of the above described attacks, distinct embedder stego key management (as opposed to extractor stego key management) techniques can be additionally implemented on the embedder side but they are not the subject of the present application. Extractor and embedder stego key management techniques are distinct from one another since embedding and extraction of watermarks are carried out in different environments and are subject to different security and computational complexity requirements. One of the important distinctions is that embedders are typically individually licensed products that can be tracked and updated as needed, while extractors are typically distributed as part of another device (e.g., software media players, hardware media players, operating systems of a computer or handheld device, etc.) to general public and thus much more difficult to access and update. Therefore, embedder stego key modifications can be implemented with fewer security concerns since embedding entities are often content owners (or agents thereof) under contractual obligations, and also have a vested interest in preventing leaks and protecting their content.

Furthermore, watermark embedding operations are typically much more computationally expensive than watermark extraction operations and, as such, there is less concern regarding an increase in computational complexity (albeit within reasonable limits) in watermark embedders when compared to watermark extractors. For example, watermark extractors can be implemented as part of a handheld device or within an operating system with stringent memory and computational resource (e.g., Mega Instructions Per Second (MIPS)) requirements. Thus, watermark extractors are often highly optimized to conform to the allocated computational resources of the host device, and any change in extraction stego key size or extractor computational complexity can potentially affect the optimized performance and/or exceed the available resources.

Therefore, stego key management for extractors needs to be defined and implemented distinctly from embedder stego key management. In example scenarios, where both embedder and extractor stego key management techniques are used, extractor stego key management is often defined first, while embedder stego key management is implemented later, in view of the status of extractor key set deployment.

In some embodiments of the present application, the extractor is configured to allow quick and reliable stego key replacement while minimizing extractor changes. In one example embodiment, stego key replacement is achieved by replacement of certain parameters without changing the size of the actual executable code of the watermark extractor, memory requirements and/or hardware components that carry out the extraction operations. For example, a new extraction stego key can be loaded as new parameter values into memory locations of a memory unit within the watermark extractor, and/or replaceable parameters can be passed to the module that carries out watermark extraction operations. In implementations that use, at least in-part, software modules or codes that are executed by a processor, special care must be taken such that the processing load of the processor (e.g., peak load, average load, etc.) is not increased, and that memory footprint of the software module is not changed. To this end, a subset of extraction validation tests are designed to allow validation of extraction stego key replacement.

One way to ensure identical code size, processing load, and memory footprint is to place all extraction stego keys in a stego key file that is accessed by the software module that performs watermark extraction operations. In this scenario, the extractor code is not changed when the stego key file is replaced. This architecture, however, may pose a security risk since an attacker may become aware of the existence and location of the stego key file and either replace the file or interfere with communications between the extractor and the stego key file. Note that the extraction operations cannot properly provide content protection if the stego key file is modified. To mitigate this security concern, in some embodiments which utilize a software extraction module implemented on a media handling device, the stego key parameters are integrated with the executable watermark extraction code. As such, any change in the extraction stego key parameters actually requires a new compilation of the extractor executable code. Yet, the change of stego key parameters is done such that the extractor operations retain the same sequence of the instructions before and after the change, and retain the same memory footprint.

In some embodiments, assignment and/or distribution of extraction stego keys to various extractors is carried out systematically based on known risk factors for extractor leak. For example, proprietary or closed platforms that cannot be used for development of applications and programs by third party entities and general public, or utilize strict authorization and approval procedures for such uses, are known to be more secure than open platforms (such as a Windows, Linux, or Android platforms). Therefore, according to some embodiments of the present application, more secure platforms are assigned and include stego key sets that do not overlap with stego keys of less secure platforms. This way, if stego keys on the less secure platforms are compromised, the stego keys of the more secure platforms are not affected.

In some embodiments, a particular developer (e.g. an entity or organization that implements, or ports, watermark extractors to a particular hardware platform, and thus has access to all extractor secrets) is provided with multiple sets of extraction stego keys. For example, this could be the case when a particular device model has a large market share. In such a scenario, when a single device is compromised and a particular content is attacked based on the compromised stego keys (e.g., watermark locations corresponding to the compromised extraction stego key are modified), proper operation of a large number of devices in the field can be potentially disrupted. In accordance with an example embodiment, to mitigate this type of attack scenario, the devices associated with that particular developer are partitioned in groups (e.g. regional groups), and a distinct extraction stego key set is assigned to each of the groups. This way, if a single device is compromised, only the group associated with the compromise device will fail to enforce watermark-based content protection rules, while other groups of devices will continue to use the non-compromised stego keys (e.g. to enforce content protection). Typically, extraction stego key sets that are assigned to each of distinct groups for the same type of device (e.g., model or brand) have a significant overlap (e.g., greater than 50%) with the extraction stego key sets assigned to another group for the same type of device. The provision of such overlap is based on the assumption that all devices of the same type (e.g., brand, model) utilize similar security features and are, thus, similarly robust (or prone) to penetration and reverse engineering attacks. Therefore, if an attacker is successful in compromising one of these devices, he/she is likely to be successful in compromising other similar devices. By assigning extraction stego key sets with substantial overlap to such groups of devices, only a limited set of extraction stego keys (i.e., a limited portion of the extraction stego key space) is exposed to such a class-wide attacks. Similarly, if a dishonest developer leaks its assigned stego key sets to an attacker, the damage will be limited to a particular portion of the extraction stego key space.

In another exemplary scenario, where a system-on-chip (SoC) manufacturer provides a watermark extractor component to multiple device manufacturers, multiple sets of stego keys are provided to the SoC manufacturer. This scenario is different from the above noted scenario in that the SoC can be implemented in wide variety of devices (e.g., different models and brands), with potentially different security architectures and computational capabilities. In such a scenario, multiple sets of extraction stego keys are distributed to a developer with a high degree of overlap so that compromise of such extraction stego keys, say by dishonest developer, would have a limited impact on the other portions of the stego key space.

The following describes an example extraction stego key management operation, in accordance with an embodiment of the present application, in response to a detected attack on a particular stego key. In the case of a successful attack on a protected content that removes or modifies the embedded watermarks therein, the first step is to analyze the compromised content to determine which watermarks in the content are disabled or modified. In an example embedding scenario, each content is marked with multiple watermarks using different embedding stego key sets such that various extractor devices each with a particular extraction stego key can extract a subset of embedded watermarks. In such an example scenario, if a single extractor device is compromised, only a single extraction stego key is revealed. Knowing the extraction stego key associated with the compromised device, an attacker may then attempt to modify or disable (e.g., overwrite, remove, add noise, or perform other operations) specific embedded watermarks within the content so to circumvent their extraction by the compromised device. Analyzing such a modified content reveals which watermark locations have been disabled, and in turn, identifies which extraction stego key (or stego keys if multiple devices are compromised) have been compromised.

Once the compromised extraction stego keys are identified, a new assignment of stego keys needs to be executed in order to minimize the impact of the attack. The general objective of such a new assignment is to move the deployed set of extraction stego keys away from the compromised stego keys. Update of the extraction stego key sets can be achieved by one or both of the following operations: (1) updating the existing devices (i.e., devices that are deployed in the field) to include newly assigned extraction stego keys (or key parameters), and/or (2) changing the extraction stego key sets that are assigned to newly deployed devices. The update of stego key sets of existing devices (i.e., operation (1) above) is typically done for only non-compromised devices to avoid loss of further extraction stego key space due to potential repeat of attacks using compromised devices. However, such an update for compromised devices may also be allowed when known security vulnerabilities of those devices are successfully addressed. For example, such updates in compromised devices can be provided once leaks or weaknesses in extractor device implementation, integration of the extractor module into a larger system, or the signal flow that led to the compromise have been fixed. To this end, an indication may be received at the extraction stego key management device that is indicative of trustworthiness of a compromised device before a new extraction stego key is communicated to that device. Change of extraction stego key sets for newly deployed devices (i.e., operation (2) above) can take effect immediately after an extraction key compromise is detected if such newly deployed devices do not suffer from the same vulnerabilities as the compromised devices. Such an action improves the security of the overall system, and frustrates the attempts of attackers on the extraction stego key space.

In some embodiments, as attackers manage to penetrate more and more devices and increase the aggregate pool of compromised extraction stego keys, one or more operations are carried out to shift the uncompromised stego key space. For example, new extraction stego keys are produced to expand the number of embedding opportunities, and therefore, allow the creation of new extraction stego keys. This can be carried out by, for example, creating a new dimension for the embedding and extraction stego keys or by modifying a currently known embedding dimension. For example, a new information carrier signal (e.g., a new random sequence that modulates watermark bits can be introduced in watermarking technology based on spread spectrum, or a new replica signal can be introduced in the watermarking technology based on replica signal modulation) can be generated and used for both embedding and extraction of new watermarks. In another example, a new sequence of autocorrelation delays, frequency shifts, frequency bands, bit rates, etc. may be selected for embedding of watermarks. As noted earlier in this application, once the extractor stego key set modification is designed and implemented, a corresponding change to the embedding stego key set can be propagated to the deployed watermark embedders (which typically operate under licensed agreements at known and secure locations).

Alternatively, or additionally, in some embodiments, not all of the existing extraction stego key space is initially utilized, thus allowing the selection of a different (and unused) extraction stego key set without the need to necessarily expand the embedding stego key space. The generation of an expanded stego key set, or shift to an unused portion of the extraction stego key space, allows old and/or comprised extraction stego key sets to be retired.

Using the above noted generation of new extraction stego key sets and/or retirement of compromised extraction stego key sets provide for a virtually unlimited expansion of the stego key space, and endless updates to compromised devices that can be made more secure based on the knowledge of leaks and device vulnerabilities. These operations to thwart circumvention attempts can produce a continuous race where the attackers are at a disadvantage of constantly needing to reinvent device circumvention and penetration techniques, as well as needing to retain and use obsolete and bloated aggregated extraction key sets. In particular, since an attacker is not certain how the assignment and distribution of the updated extraction stego key sets occur, the attacker is forced to modify a particular content with all known (i.e., compromised) stego key sets to thwart the extraction of the embedded watermarks. Such a modification inevitably leads to a degradation in perceptual quality of the content, and creates a burden on the attacker for managing and keeping track of all compromised stego key sets.

Figure 5:
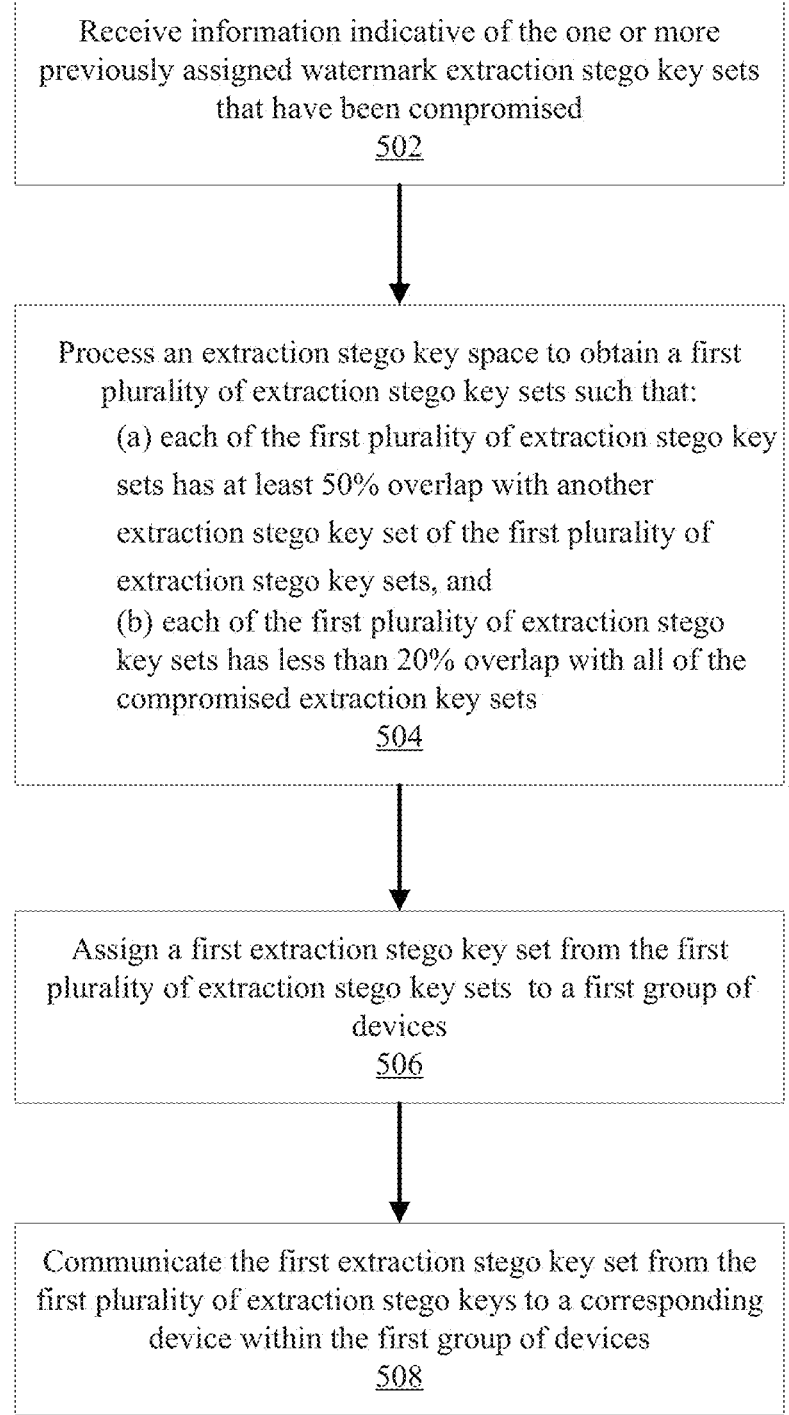
FIG. 5 illustrates a set of operations that can be carried out to effect stego key management when or more existing extraction stego key sets have been compromised.

FIG. 5 illustrates a set of operations 500 that can be carried out to effect stego key management when one or more existing extraction stego key sets have been compromised. The operations 500 can be carried out at, for example, a stego key management device at a stego key management center. At 502, information indicative of one or more previously assigned watermark extraction stego key sets that have been compromised is received. At 504, an extraction stego key space is processed to obtain a first plurality of extraction stego key sets such that (a) each of the first plurality of extraction stego key sets has at least 50% overlap with another extraction stego key set of the first plurality of extraction stego key sets, and (b) each of the first plurality of extraction stego key sets has less than 20% overlap with all of the compromised extraction key sets. It should be noted that in some embodiments, there is no overlap between the first plurality of extraction stego key sets and all of the compromised extraction key sets. In another embodiment the overlap can be less than 2%. At 506, a first extraction stego key set from the first plurality of extraction stego key sets is assigned to a first group of devices and, at 508, the first extraction stego key set from the first plurality of extraction stego keys is communicated to a corresponding device within the first group of devices.

The processing of the stego key space (i.e., operations at 504 in FIG. 5) is conducted according to a particular algorithm or method. The extraction stego key space of the present application identifies a very large number of potential watermark extraction opportunities and allows a large number of extraction stego key sets to be constructed (e.g., as shown in FIG. 2, an example 82-bit embedding stego key can provide $2^{82}$ watermark embedding opportunities, with an even larger corresponding watermark extraction locations). In one example methodology, the available stego key space is computed by subtracting the compromised portion of the stego key space from the overall stego key space. Next, the resulting stego key space is partitioned into two or more sections, where a first section of the partitioned stego key space is used for construction of the first plurality of extraction stego keys, while the remaining section or sections of the stego key space are reserved for future use. One example method for generation of the first plurality of stego keys includes determining the number of stego keys needed (e.g., N stego keys) and selecting the extraction stego key parameters for each of N stego keys such that the overlap requirement is satisfied. For example, the constituent parameters for each of the N extraction stego key sets are selected to create at least 50% overlap in the stego key space between each of the N stego key sets and at least another one of the N stego key sets.

As noted earlier, each of the first plurality of extraction stego key sets can be processed with a watermark extraction engine to ensure that a number of watermark extraction operations and memory footprint remain unchanged as compared to a number of watermark extraction operations and memory footprint associated with the compromised extraction stego key sets. For instance processing the extraction stego key space can include generating a new processor-executable program code that includes both the newly generated extraction stego key set and a watermark extraction program code. Such a new processor-executable code can be communicated to a device, stored on a tangible storage medium of the device to replace the old processor-executable program code.

Processing the extraction stego key can also produce another (e.g., a second) plurality of stego key sets that are assigned to another group (e.g., a second group of devices). For example, the second group of devices may reside in a more secure platform that the first group of devices mentioned above. Each of the second plurality of extraction stego key sets has a significant (e.g., at least 50%) overlap with another extraction stego key set of the second plurality of extraction stego key sets, and each of the second plurality of extraction stego key sets can have less than 20% overlap with all of the compromised extraction key sets. In some embodiments, the first and second extraction key sets have no overlap with one another. In one exemplary embodiment, each of the second plurality of extraction stego key sets has less than 10% overlap with all of the first plurality of extraction stego key sets. Yet in another embodiment, each of the second plurality of extraction stego key sets has less than 1% overlap with all of the first plurality of extraction stego key sets, while in another embodiment there is no overlap between each of the second plurality of extraction stego key sets and all of the first plurality of extraction stego key sets. In each of the above overlap scenarios, the separation of the first and the second plurality of extraction stego key sets (and thus immunity of one key set against leaks in the other key set) is traded off against consuming more or less of the stego key space.

Figure 6:
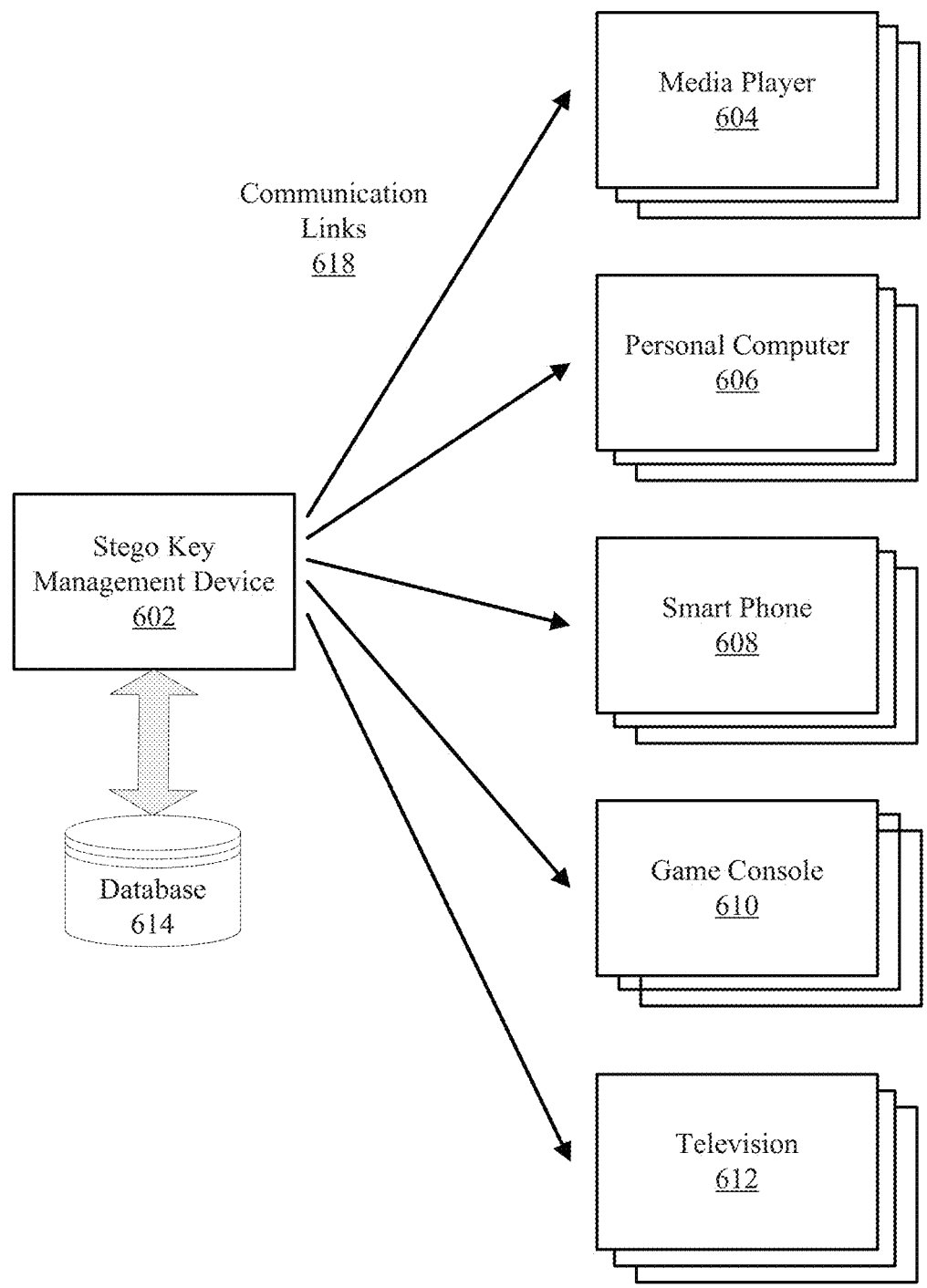
FIG. 6 illustrates a system for updating and managing extraction stego keys in accordance with an exemplary embodiment.

FIG. 6 illustrates a system for updating and managing extraction stego keys in accordance with an exemplary embodiment. In FIG. 6, the stego key management device 602 is directly or indirectly in communication with a variety of devices 604 to 612 through one or more communication links 618. In some examples, the communication links are secure links and may be bi-directional. A variety of device authentication and handshaking protocols may be used to establish a secure link between the stego key management device 602 and devices 604 to 612. Such devices can include, for example, media players 604, personal computers 606, smart phones 608, game consoles 610, televisions 612, and other devices that include a media handling device with an associated watermark extractor. The stego key management device 602 can be in communication with a database 614, which can, for example, store information related to compromised stego keys, compromised contents, authorization information, information needed to communicate with other devices, information regarding trustworthiness (or lack thereof) of particular devices or device types, and other stored information. The stego key management device 602 can also be in communication with other entities and devices (not shown), such as certificate authorities and authorization authorities, or may be part of a larger system of content management and distribution network.

Figure 7:
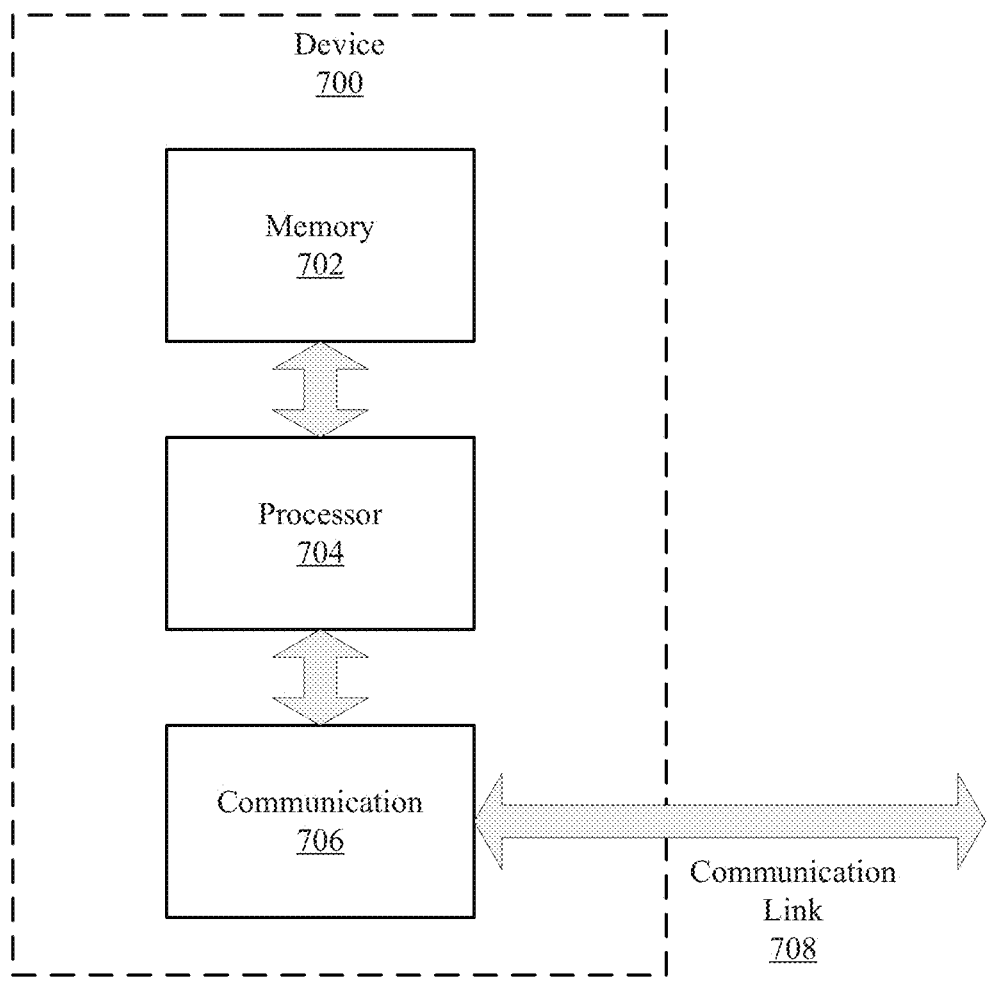
FIG. 7 illustrates a block diagram of a device 700 within which various disclosed embodiments may be implemented.

Certain aspects of the disclosed embodiments can be implemented as a device that includes a processor and a memory comprising processor executable code. The processor executable code, when executed by the processor, configures the device to perform any one of and/or all operations that are described in the present application. For example, FIG. 7 illustrates a block diagram of a device 700 within which various disclosed embodiments may be implemented. The device 700 comprises at least one processor 704 (e.g., a microprocessor) and/or controller, at least one memory 702 unit that is in communication with the processor 704, and at least one communication unit 707 that enables the exchange of data and information, directly or indirectly, through the communication link 708 with other entities, devices, databases and networks. The communication unit 706 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 700 of FIG. 7 may be integrated as part of any of the devices that are shown in FIG. 6, such as the stego key management device 602, and any of the devices 604 to 612.

The disclosed embodiments can be implemented using hardware devices that comprise particular physical components. For example, the devices of the present application can be implemented as an application specific integrated circuit (ASIC), as part of a field programmable gate array (FPGA), and/or using digital and analog components and circuitry.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for watermark extraction stego key management when one or more existing extraction stego key sets have been compromised, the method comprising:
receiving information indicating that one or more previously assigned watermark extraction stego key sets that have been compromised;
processing an extraction stego key space to obtain a first plurality of extraction stego key sets such that:
(a) each of the first plurality of extraction stego key sets has at least 50% overlap with another extraction stego key set of the first plurality of extraction stego key sets, and
(b) each of the first plurality of extraction stego key sets has less than 20% overlap with all of the compromised extraction key sets;
assigning a first extraction stego key set from the first plurality of extraction stego key sets to a first group of devices; and
communicating the first extraction stego key set from the first plurality of extraction stego keys to a particular device within the first group of devices:
each extraction stego key set includes a plurality of components, each component representing a dimension in the extraction stego key space that identifies a specific aspect of embedded watermarks or watermarking system, and
processing the extraction stego key space to obtain a first plurality of extraction stego key sets further comprises:
processing each of the first plurality of extraction stego key sets with a watermark extraction engine associated with the first group of devices to ensure that both (a) a number of watermark extraction operations and (b) memory footprint associated with the processed extraction stego key set and the watermark extraction engine remain unchanged as compared to a number of watermark extraction operations and memory footprint associated with the one or more compromised extraction stego key sets and the watermark extraction engine.

2. The method of claim 1, wherein a portion of the extraction stego key space associated with the one or more compromised extraction stego key sets is retired from further use.

3. The method of claim 1, further comprising:
assigning a second extraction stego key set from the first plurality of extraction stego key sets to a second group of devices; and
communicating the second extraction stego key set from the first plurality of extraction stego key sets to a particular device within the second group of devices.

4. The method of claim 3, wherein each device within the first group of devices corresponds to a first model and brand of a particular type of media handling device, and each device within the second group of devices corresponds to a second model and brand of the particular type of media handling device.

5. The method of claim 3, wherein each device within the first group of devices corresponds to a first manufacturer of a media handling device, and each device within the second group of devices corresponds to a second manufacturer of a media handling device.

6. The method of claim 1, wherein each device within the first group of devices corresponds to a first model and brand of a particular type of media handling device.

7. The method of claim 1, further comprising:
processing the extraction stego key space to obtain a second plurality of extraction stego key sets such that:
(a) each of the second plurality of extraction stego key sets has at least 50% overlap with another extraction stego key set of the second plurality of extraction stego key sets,
(b) each of the second plurality of extraction stego key sets has less than 20% overlap with all of the compromised extraction key sets, and
(c) each of the second plurality of extraction stego key sets has less than 10% overlap with all of the first plurality of extraction stego key sets; and
assigning a first extraction stego key set from the second plurality of extraction stego key sets to a particular device within a second group of devices.

8. The method of claim 7, wherein all devices within the first group of devices are protected against watermark extraction circumvention according to a first level of security, and all devices within the second group of devices are protected against watermark extraction circumvention according to a second level of security.

9. The method of claim 8, wherein the processing of the extraction stego key space to obtain the first and the second plurality of extraction stego key sets is conducted so as to allocate a first portion of the extraction stego key space to accommodate all of the first plurality of extraction stego key sets and allocate a second portion of the extraction stego key space to accommodate all of the second plurality of extraction stego key sets, and wherein the first portion is non-overlapping with the second portion.

10. The method of claim 1, wherein each device within the first group of devices utilizes similar security measures as any other device within the first group of devices against watermark extraction circumvention attacks.

11. The method of claim 1, wherein processing the extraction stego key space comprises expanding the extraction stego key space to obtain at least a portion of the first plurality of extraction stego key sets from the expanded extraction stego key space.

12. The method of claim 11, wherein expanding the extraction stego key space comprises generating one or more new extraction stego key space dimensions.

13. The method of claim 1, wherein the particular device within the first group of devices to which the first extraction stego key set from the first plurality of extraction stego key sets is communicated is a newly deployed device.

14. The method of claim 1, further comprising:
receiving an indication that the particular device within the first group of devices is a trustworthy device, wherein only upon receiving the indication, the first extraction stego key set from first plurality of extraction stego key sets is communicated to the particular device.

15. The method of claim 1, further comprising producing a new processor-executable program code that includes both the first extraction stego key set and a watermark extraction program code, wherein communicating the first extraction stego key set comprises communicating the new processor-executable program code to the particular device.

16. The method of claim 15, wherein the size of the new processor-executable program code is identical to the size of an old processor executable code that includes both one of the one or more previously assigned watermark extraction stego key sets that has been compromised and the watermark extraction program code.

17. The method of claim 16, wherein the new processor executable program code is received at the particular device and stored on a tangible storage medium of the particular device to replace the old processor-executable program code.

18. The method of claim 1, wherein the plurality of components identify two or more of the following aspects of the embedded watermarks or the watermarking system:
a pseudorandom sequence used for detection of watermarks;
a replica signal used for detection of watermarks;
an autocorrelation value used for detection of watermarks;
a frequency shift used for detection of watermarks;
a frequency band used for detection of watermarks;
a watermark bit rate;
a time segment within the content that accommodates watermarks; or
a watermark extraction algorithm used for detection of watermarks.

19. A device, comprising:
a processor; and
a memory comprising processor executable code, the processor executable code, when executed by the processor, configures the device to:
receive information indicative of one or more previously assigned watermark extraction stego key sets that have been compromised;
process an extraction stego key space to obtain a first plurality of extraction stego key sets such that:
(a) each of the first plurality of extraction stego key sets has at least 50% overlap with another extraction stego key set of the first plurality of extraction stego key sets, and
(b) each of the first plurality of extraction stego key sets has less than 20% overlap with all of the compromised extraction key sets;
assign a first extraction stego key set from the first plurality of extraction stego keys to a first group of devices; and
communicate the first extraction stego key set from the first plurality of extraction stego keys to a particular device within the first group of devices, wherein each extraction stego key set includes a plurality of components, each component representing a dimension in the extraction stego key space that identifies a specific aspect of embedded watermarks or watermarking system, and the processor executable code, when executed by the processor, further configures the device to further process each of the first plurality of extraction stego key sets with a watermark extraction engine associated with the first group of devices to ensure that both (a) a number of watermark extraction operations and (b) memory footprint associated with the processed extraction stego key set and the watermark extraction engine remain unchanged as compared to a number of watermark extraction operations and memory footprint associated with the one or more compromised extraction stego key sets and the watermark extraction engine.

20. The device of claim 19, wherein the processor executable code, when executed by the processor, further configures the device to retire from further use a portion of the extraction stego key space associated with the one or more compromised extraction stego key sets.

21. The device of claim 19, wherein the processor executable code, when executed by the processor, further configures the device to:
assign a second extraction stego key set from the first plurality of extraction stego key sets to a second group of devices; and
communicate the second extraction stego key set from the first plurality of extraction stego key sets to a particular device within the second group of devices.

22. The device of claim 19, wherein each device within the first group of devices corresponds to a first model and brand of a particular type of media handling device.

23. The device of claim 22, wherein all devices within the first group of devices are protected against watermark extraction circumvention according to a first level of security, and all devices within the second group of devices are protected against watermark extraction circumvention according to a second level of security.

24. The device of claim 23, wherein the expanded extraction stego key space comprises one or more new extraction stego key space dimensions.

25. The device of claim 19, wherein each device within the first group of devices corresponds to a first model and brand of a particular type of media handling device, and each device within the second group of devices corresponds to a second model and brand of the particular type of media handling device.

26. The device of claim 25, wherein the processor executable code, when executed by the processor, further configures the device to allocate a first portion of the extraction stego key space to accommodate all of the first plurality of extraction stego key sets and allocate a second portion of the extraction stego key space to accommodate all of the second plurality of extraction stego key sets, and wherein the first portion is non-overlapping with the second portion.

27. The device of claim 19, wherein each device within the first group of devices corresponds to a first manufacturer of a media handling device, and each device within the second group of devices corresponds to a second manufacturer of a media handling device.

28. The device of claim 19, wherein the processor executable code, when executed by the processor, further configures the device to:
  process the extraction stego key space to obtain a second plurality of extraction stego key sets such that:
    (a) each of the second plurality of extraction stego key sets has at least 50% overlap with another extraction stego key set of the second plurality of extraction stego key sets,
    (b) each of the second plurality of extraction stego key sets has less than 20% overlap with all of the compromised extraction key sets, and
    (c) each of the second plurality of extraction stego key sets has less than 10% overlap with all of the first plurality of extraction stego key sets; and
  assign a first extraction stego key set from the second plurality of extraction stego key sets to a particular device within a second group of devices.

29. The device of claim 19, wherein each device within the first group of devices utilizes similar security measures as any other device within the first group of devices against watermark extraction circumvention attacks.

30. The device of claim 19, wherein the processor executable code, when executed by the processor, configures the device to process the extraction stego key space to expand the extraction stego key space, and to obtain at least a portion of the first plurality of extraction stego key sets from the expanded stego key space.

31. The device of claim 19, wherein the particular device within the first group of devices to which the first extraction stego key set from the first plurality of extraction stego key sets is communicated is a newly deployed device.

32. The device of claim 19, wherein the processor executable code, when executed by the processor, further configures the device to:
  receive an indication that the particular device within the first group of devices is a trustworthy device, wherein only upon receiving the indication, the first extraction stego key set from the first plurality of extraction stego key sets is communicated to the particular device within the first group of devices.

33. The device of claim 19, wherein the processor executable code, when executed by the processor, further configures the device to produce a new processor-executable program code that includes both the first extraction stego key set and a watermark extraction program code, wherein the device is configured to communicate the first extraction stego key set as part of the new processor-executable program code to the particular device.

34. The device of claim 33, wherein size of the new processor-executable code is identical to size of an old processor executable code that includes both one of the one or more previously assigned watermark extraction stego key sets that has been compromised and the watermark extraction program code.

35. A computer program product, embodied on one or more non-transitory computer readable media, comprising:
  program code for receiving information indicative of the one or more previously assigned watermark extraction stego key sets that have been compromised;
  program code for processing an extraction stego key space to obtain a first plurality of extraction stego key sets such that:
    (a) each of the first plurality of extraction stego key sets has at least 50% overlap with another extraction stego key set of the first plurality of extraction stego key sets, and
    (b) each of the first plurality of extraction stego key sets has less than 20% overlap with all of the compromised extraction key sets;
  program code for assigning a first extraction stego key set from the first plurality of extraction stego key sets to a first group of devices; and
  program code for communicating the first extraction stego key set from the first plurality of extraction stego key sets to a particular device within the first group of devices, wherein processing the extraction stego key space to obtain a first plurality of extraction stego key sets further comprises:
    processing each of the first plurality of extraction stego key sets with a watermark extraction engine associated with the first group of devices to ensure that both (a) a number of watermark extraction operations and (b) memory footprint associated with the processed extraction stego key set and the watermark extraction engine remain unchanged as compared to a number of watermark extraction operations and memory footprint associated with the one or more compromised extraction stego key sets and the watermark extraction engine.

36. The computer program product of claim 35, further comprising program code for producing a new processor-executable program code that includes both the first extraction stego key set and a watermark extraction program code, wherein the first extraction stego key set is communicated to the particular device as part of a new processor-executable program code.

37. The computer program product of claim 36, wherein size of the new processor-executable program code is identical to size of an old processor executable code that includes both one of the one or more previously assigned watermark extraction stego key sets that has been compromised and the watermark extraction program code.

38. A system comprising:
  a stego key management device comprising:
    a processor; and
    a memory comprising processor executable code, the processor executable code, when executed by the processor, configures the stego key management device to:
      receive information indicative of one or more previously assigned watermark extraction stego key sets that have been compromised;
      process an extraction stego key space to obtain a first plurality of extraction stego key sets such that:

(a) each of the first plurality of extraction stego key sets has at least 50% overlap with another extraction stego key set of the first plurality of extraction stego key sets, and
(b) each of the first plurality of extraction stego key sets has less than 20% overlap with all of the compromised extraction key sets;

assign a first extraction stego key set from the first plurality of extraction stego keys to a first group of devices, wherein each extraction stego key set includes a plurality of components, each component representing a dimension in the extraction stego key space that identifies a specific aspect of embedded watermarks or watermarking system, and the processor executable code, when executed by the processor, further configures the stego key management device to further process each of the first plurality of extraction stego key sets with a watermark extraction engine associated with the first group of devices to ensure that both (a) a number of watermark extraction operations and (b) memory footprint associated with the processed extraction stego key set and the watermark extraction engine remain unchanged as compared to a number of watermark extraction operations and memory footprint associated with the one or more compromised extraction stego key sets and the watermark extraction engine; and communicate the first extraction stego key set from the first plurality of extraction stego keys to a first device within the first group of devices; and the first device comprising:
a first processor and a first memory comprising program code executable by the first processor, the program code from the first memory when executed by the first processor, configures the first device to:
receive the first extraction stego key set from the stego key management device; and
store the first extraction stego key set at the first memory.

39. The system of claim 38, wherein the processor executable code, when executed by the processor of the stego key management device, further configures the stego key management device to produce a new processor-executable program code that includes both the first extraction stego key set and a watermark extraction program code, and to communicate the first extraction stego key set as part of the new processor-executable program code to the first device.

* * * * *